Oct. 31, 1933. O. F. RHODES 1,932,422
CONTROL FOR HEATING AND LIKE SYSTEMS
Filed Aug. 5, 1931 2 Sheets-Sheet 1
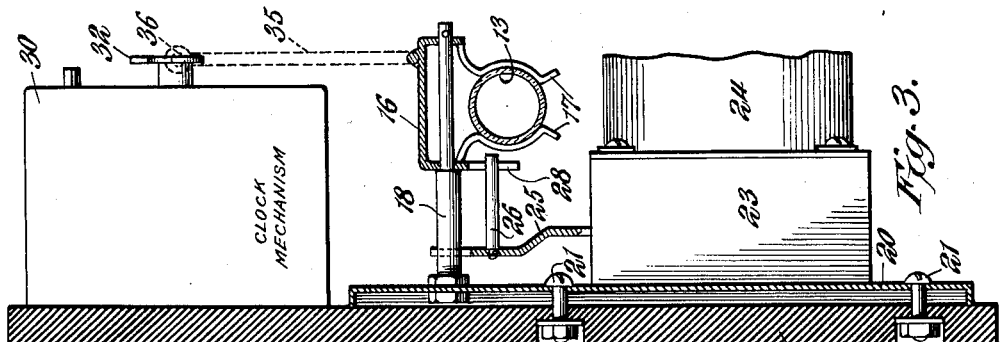
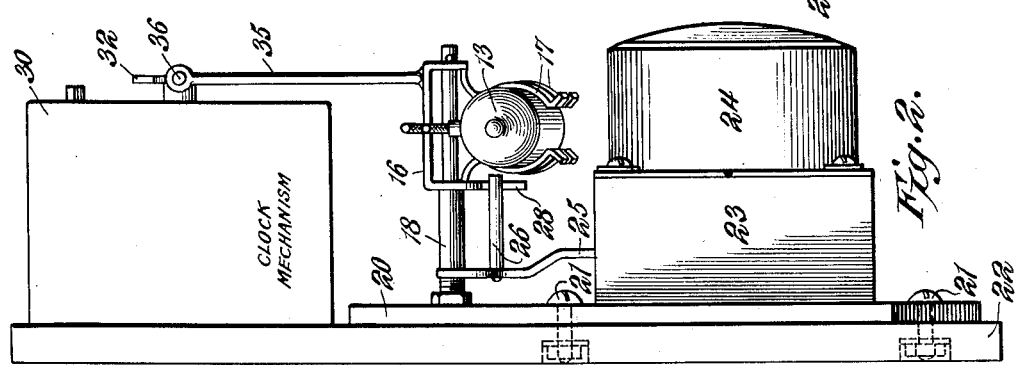
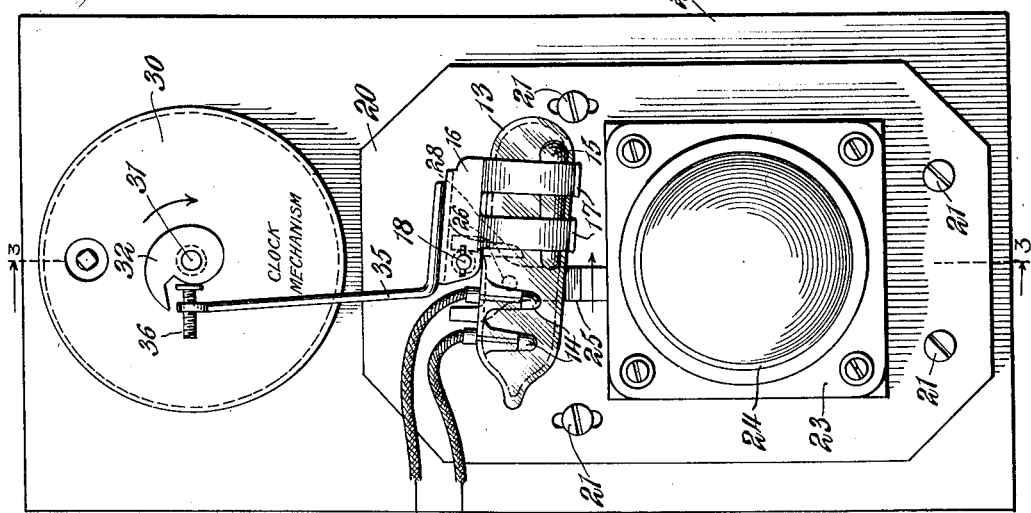
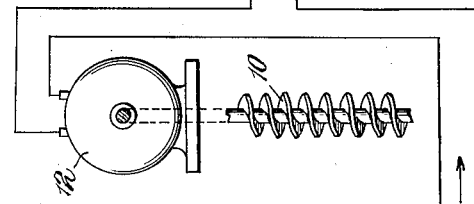
Inventor
Oliver F. Rhodes
By Mauro + Lewis
Attorneys.

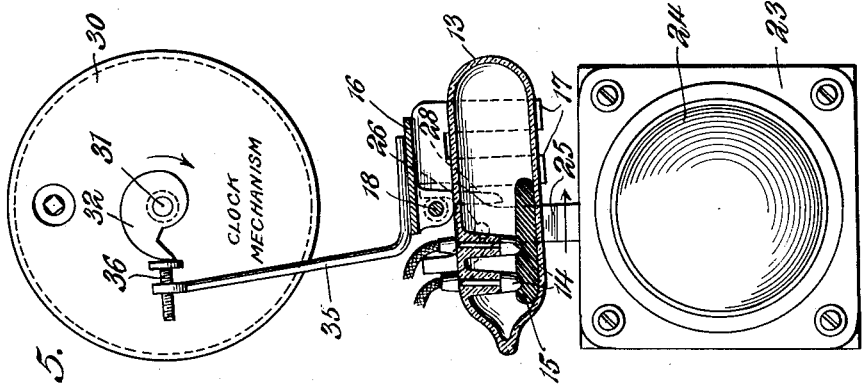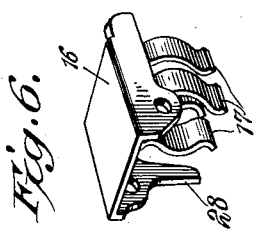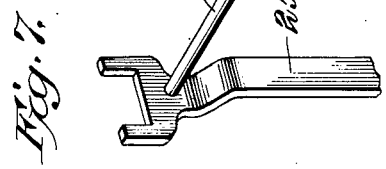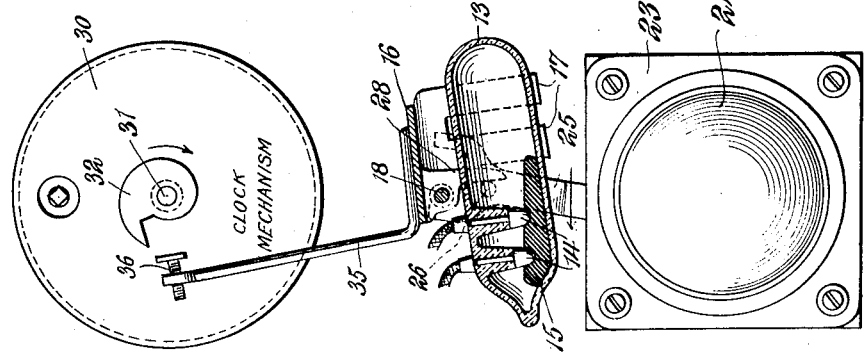

Patented Oct. 31, 1933

1,932,422

UNITED STATES PATENT OFFICE 1,932,422

CONTROL FOR HEATING AND LIKE SYSTEMS

Oliver F. Rhodes, Peru, Ind.

Application August 5, 1931. Serial No. 555,319

11 Claims. (Cl. 200—139)

The present invention has reference to a control mechanism adapted specially for use in connection with electrically operated fuel-feed systems such as are extensively used for house heating and like purposes; but said control mechanism is applicable to other uses where control of temperature is an object, such as refrigeration for example, or where changes of temperature or of pressure are utilized to start or stop the operation of the system.

Systems of the kind referred to have been provided heretofore with a plurality of controls. Thus, domestic heating plants have been equipped with clock-operated means, auxiliary to the usual thermostatic means, for putting the fuel-feed mechanism into operation at predetermined intervals and keeping it in operation for a length of time sufficient to maintain the fire regardless of temperature requirements. This has been termed "kindling". In such cases, each control has acted through its own feed-starting connections including an electric switch, whereas it is one of the objects of the present invention to combine a plurality of controls with a single electric switch, or other feed-starting device, in such manner that the starting mechanism may be responsive to either of the plurality of controls independently of the other.

A further object of the invention is to provide an electric switch having two automatic controls, each mechanically connected therewith in such manner as to actuate the same independently of the other, the connections being such as to constitute with the connected parts a unitary organization, which is compact and simple in construction (as well as efficient in operation) and can therefore be handled and readily installed as an entirety. In the embodiment herein illustrated and described by way of example the entire apparatus, comprising switch, dual controls and actuating connections between said switch and each control can be mounted on a base plate of relatively small dimensions, the parts being few and simple and the connections being direct and of the mechanical sort.

Other objects of the invention, whereby simplification and saving of cost of construction and installation are effected, with increased efficiency of operation, will be apparent from the following description of the preferred embodiment of said invention, reference being had to the accompanying drawings, in which—

Fig. 1 is a front elevation of an automatic fuel-feeding system constructed according to the present invention, including a diagrammatic showing of the electric power circuit, the driving motor connected therein, and the fuel feed-screw driven thereby;

Fig. 2 is a side elevation of the control mechanism of Fig. 1;

Fig. 3 is a vertical section on line 3—3, Fig. 1;

Fig. 4 is a view in front elevation, partly in vertical section, showing the parts in the position they occupy when the thermostatic control has acted to close the switch;

Fig. 5 is a similar view showing the parts in the position they occupy when the clock-mechanism has operated to close the switch; and Figs. 6 and 7 are detail views in perspective.

As shown in Fig. 1, the fuel feed-screw 10, of an automatically operating underfeed stoker, is actuated by an electric motor 12, the circuit whereof includes what is known as a "mercoid switch". This is a well known device for automatically making and breaking an electric circuit in response to changes in temperature, vacuum or pressure. It comprises a sealed glass tube 13 within which are the terminals 14, 14 of the power circuit. Tube 13 also contains a quantity of mercury 15, which is free to flow from one end to the other of the tube, when the latter is tilted out of its approximately horizontal position, thereby making and breaking the power circuit.

Tube 13 is detachably held in a carrier or support 16 (Fig. 6) from which depend curved spring clips 17 which partly encircle said tube and clasp it with yielding pressure. Carrier 16 is pivoted on pin 18 which projects outward from metallic plate 20 attached by screw-bolts 21 to a base plate 22 of fibrous or other insulating material adapted to be secured to the wall in a room or other space in the building whereof a change of temperature is to cause operation of the thermostatic control.

When tube 13 is tilted, so that the mercury 15 flows to the right-hand end thereof, as shown in Fig. 1, the circuit of motor 12 is open at terminals 14 and the feed-screw 10 is consequently inactive. This may be considered the normal position of the switch, which position it occupies, in the embodiment of the invention illustrated in the drawings, under the influence of gravity when free from both controls. The extent to which the tube can tilt in this direction is limited by contact of screw 36 at the upper end of arm 35 with cam 32 (Fig. 1) as presently described. Conversely when tube 13 is tilted in the opposite direction, as in Figs. 4 and 5, the mercury is in position to close the motor circuit at terminals 14. For tilting the switch or tube 13 to such closed position, two distinct means are provided, each capable of operating independently of the other.

(1) The first of these is the usual thermostatic mechanism such as commonly used in association with a mercoid switch to constitute what is commonly known as a "mercoid control". Said mechanism is contained within the casing which comprises square portion 23 and circular portion 24, and being well known is not illustrated in detail. One member thereof is shown, namely the vertical arm 25, whereby tube 13 is tilted to close the power circuit when the temperature falls (or in a refrigeration system when it rises) to the predetermined point. Said arm 25 acts for this purpose through the intermediary of pin 26, which is attached thereto near its upper end and which, when said arm swings to the right, encounters finger 28 depending from the underside of carrier 16 at the rear thereof, thereby tilting said carrier, and with it tube 13, into the position shown in Fig. 4. The upper end of arm 25 is forked (Fig. 7) and its two branches embrace between them the pivot pin 18, which thus serves as a stop and limits the throw of arm 25 in both directions.

(2) The second and independent control for the mercoid switch or other starting mechanism is preferably of the time-interval type; that is to say, it is actuated by clock-work or other mechanism to start the fuel feeding or to effect some other operation, at predetermined intervals of time.

In the drawings, 30 designates a clock mechanism, and 31 is the hour hand arbor; or it may be some other shaft, according to the intervals of time at which it is desired to actuate the switch and thereby start motor 12 (Fig. 1) for fire-kindling purposes. On arbor 31 is mounted a cam 32 with which cooperates an upwardly projecting arm 35, soldered at its lower end to tube carrier 16 and carrying in a threaded socket at its upper end a screw 36, whose head is normally in contact with the edge of cam 32 (Fig. 1).

Screw 36 is adjustable towards and from the edge of cam 32 by turning one way or the other in its threaded socket in the end of arm 35. By this means the length of the interval of time during which the motor circuit is closed periodically by the clock mechanism can be varied. Obviously the turning of screw 36 in the direction to withdraw it from its socket has the effect of lengthening the period of closure of the switch and operation of motor 12 to feed fuel, and the turning of said screw in the opposite direction has the contrary effect. Thus the amount of fuel supplied to the furnace for kindling purposes, regardless of temperature requirements can be regulated. This adjustment will also be found useful when the clock operated control is used for other than kindling purposes and may obviously be accomplished by means other than the particular means illustrated and described.

It will be seen that the apparatus as a whole, comprising the electric switch, the two independently acting controls therefor and the operating connections for each, consists of few parts, all the connections being of the mechanical sort and of very simple construction; and that the apparatus is a compact unitary organization capable of being supported in its entirely upon a base plate of small dimensions and of being readily installed as a unit.

The operation of the above described dual control switch will be readily understood. Fig. 1 shows the parts in normal position with the motor circuit open at terminals 14, tube 13 being tilted downward at its right-hand end by gravity, and the head of screw 36 being in contact with the lowermost part of cam surface 32. In that position of the parts the switch may be actuated by either of the described controls to close the motor circuit. Should the temperature fall (or if used for refrigeration, should it rise) to the limit for which the apparatus is set before cam 32 has moved appreciably, the parts will assume the position shown in Fig. 4; that is to say, arm 25 will have snapped to the right and by contact of pin 26 with finger 28 will have tilted tube 13 into the position shown in that figure, causing the mercury 15 to make contact with terminals 14 thereby closing the power circuit.

If, however, the change of temperature for which the thermostatic control is adjusted does not take place, nevertheless there will be a sufficient fuel-feed for kindling purposes; for in course of time the cam 32 will have moved sufficiently to operate the mercoid switch through arm 35. Fig. 5 shows the parts in the position they occupy when the switch has been operated by the time-interval control. It will be observed that in this case the pin 26 on arm 25 is not in contact with finger 28 of mercury tube support 16.

It will be evident that various modifications and different applications of my invention may be made without departing from the spirit thereof and within the scope of the following claims.

What is claimed is:—

1. In combination, movable means adapted to be actuated to start and to stop the operation of other means, clock or time control means having motion-transmitting connection to said movable means and adapted to act automatically through said connection and in response to predetermined conditions to cause said movable means to assume its starting position, and then its stopping position, and other control means having motion-transmitting connection to said movable means and adapted to act automatically through said connection and in response to other predetermined conditions to cause said movable means to assume its starting position and then its stopping position.

2. In combination, an electric switch; and two automatic controls each having motion-transmitting connection to said switch, one control being a clock or time control, and each control acting through said connection to cause said switch to close and then to open.

3. In combination, an electric switch; and two controls each having motion-transmitting connection to said switch, one control being a clock or time control and the other a thermostatic control, and each control acting through said connection and independently of the other to cause said switch to close and then to open.

4. In combination, an electric switch; two automatic controls therefor one of which is a clock or time control; a motion-transmitting connection from one control to the switch and through which connection said control operates to cause said switch to be closed and then to be opened independently of the operation of the other control; and another motion-transmitting connection from the other control to the switch and through which connection said other control operates to cause said switch to be closed and then to be opened independently of the operation of the first named control.

5. In combination, a mercury switch; and two automatic controls, one a clock or time control, each control having motion-transmitting connection to said switch and each acting through said connection to cause said switch to close and then to open.

6. In combination, a mercury switch; and two controls, one a clock or time control and the other a thermostatic control, each control having a motion-transmitting connection to said switch and each acting through said connection and independently of the other to cause said switch to close and then to open.

7. In combination, means adapted to start and stop the operation of other means and movably supported to occupy either of two positions; two automatic controls one of which is a clock or time control and each acting independently of the other and having a member which moves in response to predetermined conditions; and a motion-transmitting connection for each control through which movement of its said member is communicated to said movably supported means to cause it to assume its starting position and then its stopping position.

8. In combination, a switch; two controls, one of which is a clock or time control and each acting automatically and independently of the other and having a member which moves in response to predetermined conditions; and a motion-transmitting connection for each control through which movement of its said member is communicated to said switch to cause it to assume its starting position and then its stopping position.

9. In combination, an electric switch; two automatic controls each having motion-transmitting connection to said switch, one control being a clock or time control, and each control acting through said connection to cause said switch to close and then to open; and means securing said parts together in their aforesaid operative relationship and in relatively close proximity to each other and thereby constituting of the same an unitary structure of relatively small dimensions capable of being handled and installed as such.

10. In combination, an electric switch; two controls each having motion-transmitting connection to said switch, one control being a clock or time control and the other a thermostatic control, and each control acting through said connection and independently of the other to cause said switch to close and then to open; and means securing said parts together in their aforesaid operative relationship and in relatively close proximity to each other and thereby constituting of the same an unitary structure of relatively small dimensions capable of being handled and installed as such.

11. In combination, a mercury switch; two controls, one a clock or time control and the other a thermostatic control, each control having motion-transmitting connection to said switch and each acting through said connection and independently of the other to cause said switch to close and then to open; and means securing said parts together in their aforesaid operative relationship and in relatively close proximity to each other and thereby constituting of the same an unitary structure of relatively small dimensions capable of being handled and installed as such.

OLIVER F. RHODES.